(12) United States Patent
Barzilay et al.

(10) Patent No.: US 12,528,550 B2
(45) Date of Patent: Jan. 20, 2026

(54) EXPANDABLE TRAILER WITH VARIABLE-PITCH WHEEL CARRIAGE

(71) Applicant: ASPEN CUSTOM TRAILERS INC., Edmonton (CA)

(72) Inventors: Peter Hans Barzilay, Leduc (CA); John Kenneth Loyek, Leduc (CA); Patrick Scheller, Leduc (CA)

(73) Assignee: Aspen Custom Trailers Inc., Leduc (CA)

( * ) Notice: Subject to any disclaimer, the term of this patent is extended or adjusted under 35 U.S.C. 154(b) by 386 days.

(21) Appl. No.: 18/229,111

(22) Filed: Aug. 1, 2023

(65) Prior Publication Data

US 2025/0042486 A1 Feb. 6, 2025

(51) Int. Cl.
*B62D 53/06* (2006.01)
*B62D 21/14* (2006.01)
*B62D 33/08* (2006.01)
*B62D 63/06* (2006.01)

(52) U.S. Cl.
CPC ........... *B62D 53/067* (2013.01); *B62D 21/14* (2013.01); *B62D 33/08* (2013.01); *B62D 63/061* (2013.01)

(58) Field of Classification Search
CPC ...... B62D 53/067; B62D 21/14; B62D 33/08; B62D 63/061
See application file for complete search history.

(56) References Cited

U.S. PATENT DOCUMENTS

| | | | | |
|---|---|---|---|---|
| 4,318,656 A | * | 3/1982 | Ezell | B60P 3/07 414/471 |
| 5,370,414 A | * | 12/1994 | Tucker | B62D 53/061 280/476.1 |
| 5,924,754 A | * | 7/1999 | Kuhns | B62D 53/067 296/184.1 |

(Continued)

FOREIGN PATENT DOCUMENTS

| | | | | |
|---|---|---|---|---|
| EP | 3623262 A1 | * | 3/2020 | ........... B62D 63/061 |
| WO | WO-2009158329 A2 | * | 12/2009 | ............. B60P 3/122 |
| WO | WO-2013132468 A1 | * | 9/2013 | ............. B60D 1/245 |

*Primary Examiner* — Jacob B Meyer
(74) *Attorney, Agent, or Firm* — Donald V. Tomkins (57) ABSTRACT

An expandable multiple-axle trailer has a trailer wheel carriage with left and right sub-carriages having corresponding forward-extending sub-carriage extensions, the front ends of which define sub-carriage extension tongues laterally movable within slots in a first transverse trailer structure member while being constrained against longitudinal and vertical movement relative to the trailer, while intermediate regions of the sub-carriage extensions are correspondingly laterally movable within fulcrum slots in a second transverse trailer structure member aft of the first transverse member. The trailer wheel carriage incorporates actuation means for transitioning the trailer wheel carriage assembly between laterally-retracted and laterally-expanded configurations. The slots in the first and second transverse members define guide surfaces angularly oriented such that transitioning to the expanded configuration will alter the longitudinal pitch of the trailer wheel carriage to raise the rearmost axle relative to the forwardmost axle, and vice versa when transitioning to the retracted configuration.

9 Claims, 12 Drawing Sheets

(56) References Cited

U.S. PATENT DOCUMENTS

| | | | | |
|---|---|---|---|---|
| 6,652,003 B2* | 11/2003 | Most | ...... | B62D 21/02 |
| | | | | 280/789 |
| 8,317,215 B2* | 11/2012 | Quenzi | ...... | B62D 53/065 |
| | | | | 280/425.2 |
| 9,422,015 B1* | 8/2016 | Fraley | ...... | B62D 21/09 |
| 10,953,936 B2* | 3/2021 | Lutz | ...... | B62D 33/08 |
| 11,267,309 B2* | 3/2022 | Strelic | ...... | B62D 63/061 |
| 11,873,035 B2* | 1/2024 | Lutz | ...... | B62D 63/061 |
| 11,952,036 B2* | 4/2024 | Scheller | ...... | B62D 13/005 |
| 12,246,783 B2* | 3/2025 | Poole | ...... | B62D 53/067 |
| 12,384,476 B2* | 8/2025 | Sjovall | ...... | B62D 63/061 |
| 2003/0067152 A1* | 4/2003 | Most | ...... | B62D 21/02 |
| | | | | 280/783 |
| 2011/0187084 A1* | 8/2011 | Walters, Jr. | ...... | B62D 61/00 |
| | | | | 280/656 |
| 2025/0042486 A1* | 2/2025 | Barzilay | ...... | B62D 63/061 |

* cited by examiner

EXPANDABLE TRAILER WITH VARIABLE-PITCH WHEEL CARRIAGE

FIELD

The present disclosure relates in general to flatbed trailers, and in particular to "lowboy" trailers, in which the spacing between the left trailer wheels and the right trailer wheels is selectively adjustable.

BACKGROUND

Tractor-trailer combinations consisting of flatbed trailers (or simply "flatbeds") coupled to tractor units are commonly used for transporting cargo on main roads and highways. A lowboy trailer (or simply "lowboy") is a particular type of flatbed trailer in which the trailer deck is significantly closer to the ground than the deck of a conventional flatbed, making it easier to load large cargo items onto the deck (for instance, heavy mobile equipment such as bulldozers and oversize industrial equipment components). Flatbed trailers, whether conventional or lowboy, typically have a maximum width of 102 inches (which is commonly the maximum allowable overall width of a loaded tractor-trailer stipulated in provincial and state highway transportation regulations in Canada and the U.S.), with the distance between the outer faces of the outermost tires on a given axle not exceeding 108 inches.

A conventional flatbed trailer typically has a front end configured for coupling to a tractor unit, and a rear end carrying two or three tandem axles. It is typical common for each axle to carry a total of four wheels (two on each end), and this is also the case for many lowboy trailers. However, it is also common for the axles on lowboys built to carry very heavy loads to carry eight wheels each.

It commonly occurs (such as, for example, when the cargo to be carried on a flatbed is a large, custom-manufactured industrial equipment component) that the width of the cargo exceeds stipulated maximum vehicle width limits, but it is impossible or impractical to break down the load into smaller subcomponents to keep the overall vehicle width within the regulations. In such cases, it may be possible to obtain special, trip-specific permits to allow transportation of such oversize loads, possibly subject to trip-specific conditions (such as the provision of pilot vehicles travelling ahead of and behind the tractor-trailer unit carrying the oversize cargo).

It also commonly occurs that the weight of oversize cargo to be transported on a flatbed trailer will result in wheel loads and axle loads exceeding maximum values stipulated by highway transport regulations, and it may be possible in such cases to obtain trip-specific permits allowing such oversize cargo to be transported notwithstanding that doing so will not be in compliance with such regulations.

For example, the highway transportation regulations of the State of California, like the regulations in numerous other jurisdictions, require a permit for any trailer greater than 102 inches in width, or carrying a load having a width greater than 102 inches, and also require a permit to carry loads that will result in trailer wheel loads greater than a stipulated maximum. In California, however, the maximum allowable wheel load for a trailer having a width greater than 102 inches, but with the distance between the outer faces of the outermost tires not exceeding 120 inches, is greater than the maximum allowable wheel load for a trailer having a width of 102 inches or less.

These unique California regulations have prompted the development of lowboy trailers in which all of the left-side trailer wheels and all of the right-side trailer wheels can be spread apart such that the distance between the outer faces of the outermost tires is up to 120 inches, and then retracted such that the trailer width is not more than 102 inches and the distance between the outer faces of the outermost tires is not more than 108 inches.

One exemplary way in which this functionality may be provided is by means of a trailer wheel carriage assembly comprising a left sub-carriage carrying all of the left-side trailer wheels and a right sub-carriage carrying all of the right-side trailer wheels. The front ends of the right and left sub-carriages are configured for engagement with a rear section of the trailer structure such that the longitudinal position of the sub-carriages relative to the trailer structure is fixed (preferably releasably), but the sub-carriages are laterally movable relative to the trailer structure, preferably in conjunction with one or more telescoping guide struts (or other suitable lateral stabilization means) extending between the right and left sub-carriages. Relative lateral movement of the sub-carriages may be enabled by actuation means of any functionally suitable type, such as (by way of non-limiting example) hydraulic or pneumatic cylinders, a rack-and-pinion arrangement, or a mechanical linkage of some sort, acting transversely between the right and left sub-carriages to selectively move the right and left sub-carriages either laterally outward away from each other or laterally inward toward each other. The actuation means may be operable to move the right and left sub-carriages either simultaneously or individually.

Accordingly, the hydraulic or pneumatic cylinders (or other actuation means) can be selectively actuated to move the sub-carriages outwardly away from each other (to an "expanded" configuration of the trailer wheel carriage assembly) or to draw the sub-carriages inwardly toward each other (to a "retracted" configuration of the trailer wheel carriage assembly). The transition between the minimum (retracted) and maximum (expanded) trailer widths is most easily made by actuating the cylinders (or other actuation means) while the trailer is unloaded and moving slowly.

Such trailers are known in the trade as "Expando" trailers, and they can provide obvious operational and financial benefits for their operators. However, a problem arises with "Expando" trailers (alternatively referred to herein as "expandable trailers") due to the fact that the load deck of a typical flatbed trailer is built with a camber giving it an upwardly-arched side profile when empty or lightly loaded, so that the trailer's side profile will deflect toward a horizontal configuration when the trailer is loaded, due to normal flexural deflection of the trailer's main longitudinal girders. This cambered construction of the trailer desirably promotes more uniform loading of the trailer's multiple wheels, whereas heavy loading of an uncambered trailer will tend to result in the forwardmost set of trailer wheels being more heavily loaded than the rearmost set of trailer wheels.

However, when known types of cambered multiple-axle expandable trailers are unloaded, the camber can cause only the rearmost set of trailer wheels to be in contact with the road, and with the forwardmost set of trailer wheels suspended above the road. This condition results in less available vertical travel of the trailer's suspension system in the common case of trailers that have "walking beam" suspensions (in contrast to independent suspension systems), and can result in control problems and increased tire wear when such a trailer is being transported empty. Another negative effect of trailer deck camber is reduced ground clearance at the rear of the trailer. While it might be possible to avoid or mitigate these drawbacks by means of suspension modifications in expandable trailers having a conventional deck height, such suspension modifications may be difficult or impossible to implement in an expandable lowboy trailer due to its characteristic low ground clearance.

BRIEF SUMMARY

In general terms, the present disclosure teaches embodiments of an expandable multiple-axle trailer assembly, incorporating means for maintaining optimal ground clearance and suspension system travel when the trailer assembly is in its retracted configuration, while preserving the operational benefits of cambered trailer construction when the trailer assembly is in its expanded configuration.

In one exemplary embodiment in accordance with the present disclosure, the expandable multiple-axle trailer comprises a trailer generally similar to known types of expandable trailers (such as but not limited to types specifically described above) and a trailer wheel carriage assembly comprising left and right sub-carriages generally as in known expandable trailers, but each of the left and right sub-carriages of the trailer wheel carriage assembly has a sub-carriage extension extending toward the front of the trailer, with the front ends of the sub-carriage extensions being configured as "sub-carriage tongues" that are disposable and laterally movable within corresponding "tongue slots" formed in a first (or front) transverse component installed in or already present in the trailer's deck structure. In one non-limiting embodiment in accordance with the present disclosure, the first transverse component may be a first (or front) cross-beam extending at least partially across the width of the trailer deck structure, but in other embodiments the first transverse component may be provided in any other functionally suitable form, such as but not limited to a plate or a bracket.

In this exemplary embodiment, the tongue slots in the first transverse component define ramped guide surfaces configured such that when the trailer wheel carriage is in its expanded configuration, the vertical distance between the sub-carriage tongues and the top of the trailer deck will be less than when the trailer wheel carriage is in its retracted configuration.

The sub-carriage tongues and the tongue slots are configured such that the longitudinal position of the sub-carriages relative to the trailer deck structure remains fixed regardless of the lateral position of the tongues within the tongue slots (although in variant unillustrated embodiments the sub-carriage extensions could be configured to facilitate two or more optional longitudinal positions relative to the trailer structure, to accommodate different trailers and/or to vary the overall length of the trailer assembly). As well, the tongue slots are preferably configured to constrain vertical movement of the sub-carriage tongues within the tongue slots, with only such minimal vertical clearance as may be necessary to enable lateral movement of the tongues within the tongue slots, and thereby to facilitate optimally precise control of the vertical positions of the tongues within the tongue slots.

When the sub-carriage tongues are disposed within their corresponding tongue slots in the first transverse component, as described above, an intermediate region of each sub-carriage extension (aft of the tongues) will be disposed and laterally movable within corresponding slots formed in a second (or rear) transverse component installed in or already present in the trailer deck structure aft of the first transverse component. In one non-limiting embodiment in accordance with the present disclosure, the second transverse component may be a second (or rear) cross-beam extending at least partially across the width of the trailer deck structure, but in other embodiments the second transverse component may be provided in any other functionally suitable form, such as but not limited to a plate or a bracket. Similar to the tongue slots in the first transverse component, the slots in the second transverse component are preferably configured to constrain relative vertical movement of the sub-carriage extensions within the slots in the second transverse component.

In the presently-described exemplary embodiment, the slots in the second transverse component define guide surfaces that are generally parallel to the trailer deck structure (i.e., generally horizontal). Accordingly, because the vertical position of the sub-carriage tongues relative to the trailer deck structure changes with lateral movement of the sub-carriage extensions, the slots in the second transverse component effectively act as fulcrum points for seesaw-type levering action of the sub-carriage extensions as the trailer wheel carriage is transitioned between its expanded and retracted configurations. For this reason, the slots in the second transverse component may be alternatively referred to herein as "fulcrum slots".

In alternative embodiments, however, the guide surfaces of the fulcrum slots in the fulcrum beam may be ramped rather than horizontal, with the guide surfaces of the tongue slots in the first transverse component being either ramped (at a different angular orientation than the fulcrum slot guide surfaces) or horizontal, while still providing the same operational functionality as the exemplary embodiment described above. In a further variant embodiment, the tongue slots in the first transverse component may be ramped as in the above-described exemplary embodiment, but with the guide surfaces of the fulcrum slots in the second transverse component being ramped (at a different angular orientation than the tongue slot guide surfaces) rather than horizontal.

In general terms, therefore, embodiments in accordance with the present disclosure are not limited to any particular configuration or configurations of the tongue slot guide surfaces and fulcrum slot guide surfaces. Persons of ordinary skill in the art will readily appreciate that various alternative configurations of the tongue slots and fulcrum slots may be devised, without the exercise of inventive ingenuity, to produce the desired operational result (i.e., that when the trailer wheel carriage is in its expanded configuration, the vertical distance between the sub-carriage tongues and the top of the trailer deck will be less than when the trailer wheel carriage is in its retracted configuration), and embodiments incorporating such alternative configurations of the tongue slots and fulcrums slots are intended to come within the scope of the present disclosure, notwithstanding that they might not be specifically described or illustrated in the present disclosure.

It follows from the foregoing discussion that transitioning of the trailer wheel carriage from the expanded configuration to the retracted configuration will have the effect of longitudinally tilting (i.e., altering the longitudinal pitch of) the trailer wheel carriage relative to the trailer structure, so as to elevate the rearmost trailer axle relative to the forwardmost trailer axle (or, to state the same thing differently, to lower the forwardmost trailer axle relative to the rearmost trailer axle), thus counteracting the tendency of the camber of the trailer deck to raise the forwardmost trailer wheels off the road surface, and thereby giving the trailer a more desirable configuration when traveling unloaded or only lightly loaded. Conversely, transitioning of the trailer wheel carriage from the retracted configuration to the expanded configuration will have the effect of lowering the rearmost trailer axle relative to the forwardmost trailer axle (or raising the forwardmost axle relative to the rearmost axle), and thus restoring the previously-noted benefits of the cambered trailer deck when heavily loaded.

Accordingly, the present disclosure describes embodiments of an expandable trailer assembly comprising: (a) a trailer having a front end, an aft end, and a trailer deck structure, with the trailer deck structure incorporating a first transverse component at a selected distance forward of the aft end of the trailer and a second transverse component aft of the first transverse component; (b) a trailer wheel carriage assembly comprising a left sub-carriage and a right sub-carriage, with each carrying a forward axle and an aft axle in tandem, and each having a sub-carriage extension having a front end defining a sub-carriage extension tongue; (c) actuation means acting transversely between the right and left sub-carriages, for selectively moving the right and left sub-carriages either laterally outward away from each other or laterally inward toward each other; and (d) means for releasably fixing the longitudinal position of the right and left sub-carriages relative to the trailer deck structure.

The first transverse component defines laterally-elongate left and right tongue slots for respectively receiving the left and right sub-carriage extension tongues. The second transverse component defines laterally-elongate left and right fulcrum slots for receiving respective intermediate regions of the left and right sub-carriage extensions. The left and right tongue slots respectively define left and right upward-facing guide surfaces for respective engagement by downward-facing contact surfaces on the left and right sub-carriage extension tongues. The left and right fulcrum slots respectively define left and right upward-facing guide surfaces for respective engagement by downward-facing contact surfaces on intermediate regions of the sub-carriage extensions.

The guide surfaces of the tongue slots and the fulcrum slots are configured such that when the left and right sub-carriage extension tongues are respectively disposed within the left and right tongue slots, and the intermediate regions of the left and right sub-carriage extensions are respectively disposed within the left and right fulcrum slots:

- laterally-outward movement of the left and right sub-carriages will elevate the forward axles relative to the aft axles; and
- laterally-inward movement of the left and right sub-carriages will lower the forward axles relative to the aft axles.

The actuation means may be of any functionally suitable type, such as (by way of non-limiting example), hydraulic cylinders, pneumatic cylinders, rack-and-pinion arrangements, and mechanical linkages.

Optionally, in alternative embodiments, expandable trailer assemblies in accordance with the present disclosure may be configured such that the longitudinal position of the right and left sub-carriages can be releasably fixed in any selected one of two or more longitudinal positions relative to the trailer deck structure, while retaining lateral adjustability as described above.

BRIEF DESCRIPTION OF THE DRAWINGS

Embodiments will now be described with reference to the accompanying Figures, in which numerical references denote like parts, and in which.

DETAILED DESCRIPTION

Figure 1A:
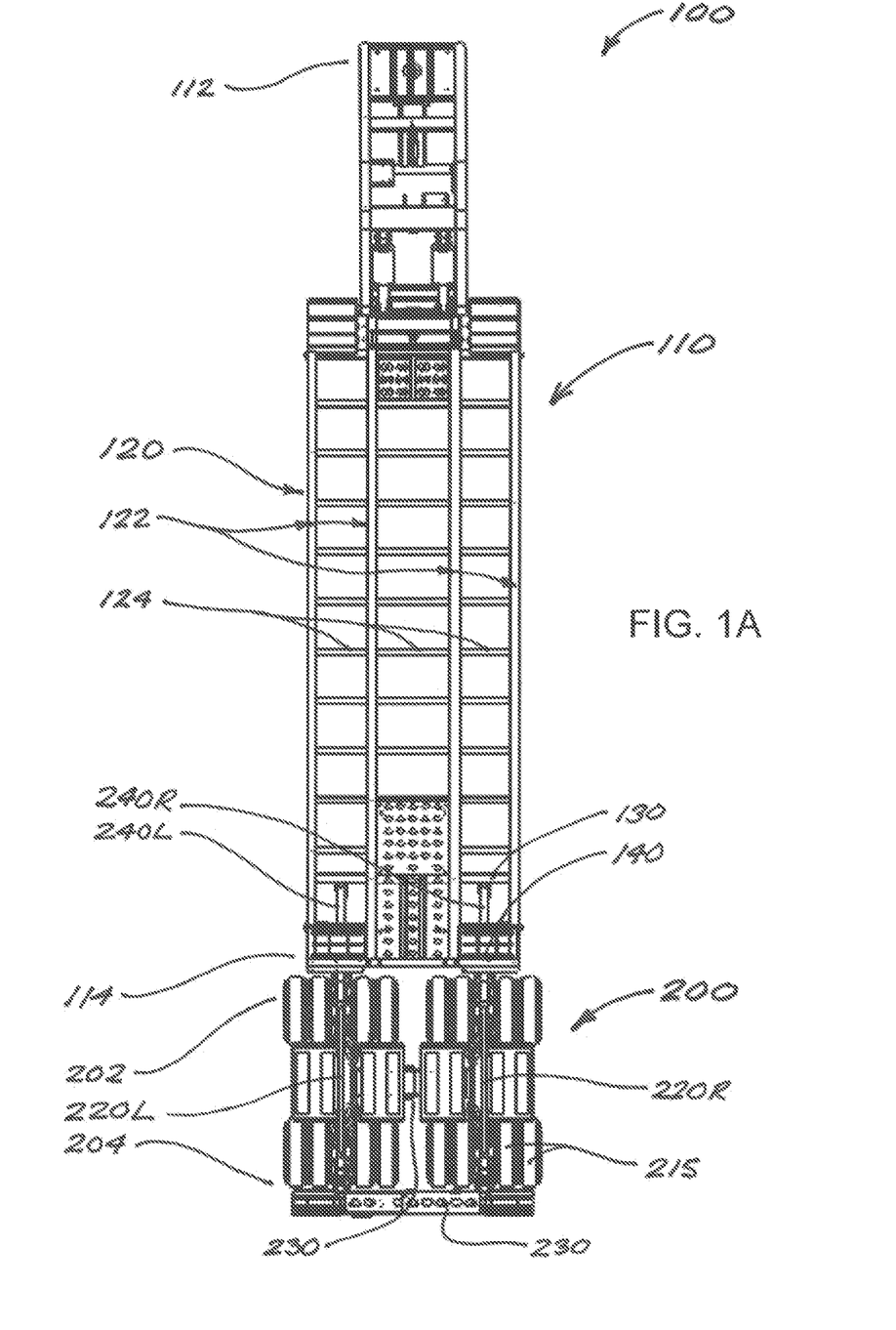
FIG. 1A is a plan view of one exemplary and non-limiting embodiment of an expandable trailer assembly in accordance with the present disclosure, shown with trailer decking materials removed to illustrate the structural framing of the trailer component of the assembly, and with the trailer wheel carriage assembly of the expandable trailer assembly shown in an expanded configuration.
Figure 1B:
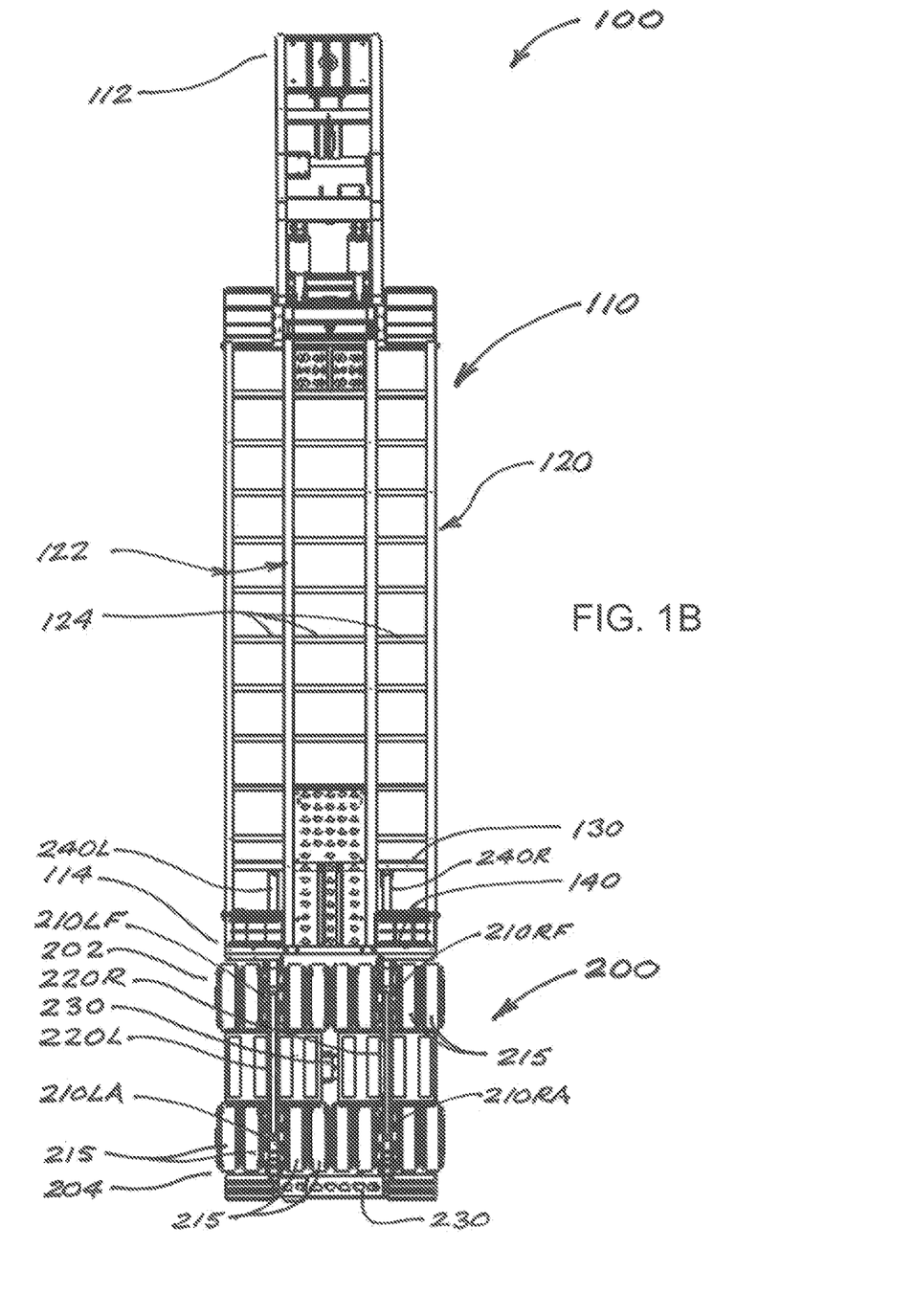
FIG. 1B is a plan view of the expandable trailer assembly in FIG. 1A, shown with the trailer wheel carriage assembly shown in a retracted configuration.

FIGS. 1A and 1B illustrate an exemplary embodiment of a lowboy trailer assembly 100 having an variable-pitch trailer wheel carriage assembly (alternatively referred to herein as simply "wheel carriage") 200 in accordance with the present disclosure. Trailer assembly 100 comprises a trailer 110 having a front (or hitch) end 112 configured for coupling to a tractor unit (not shown), an aft end 114, and a trailer deck structure 120 (shown without decking material for clarity) extending between hitch end 112 and aft end 114 of trailer 110. Trailer deck structure 120 (which may be fabricated with a longitudinal camber) is schematically illustrated as comprising various longitudinal girders 122 and lateral cross-bracing members 124. However, embodiments of trailer assemblies in accordance with the present disclosure are not restricted to trailers having any particular structural configuration except for such structural components and features as may be required to provide specific operational functionalities described herein.

Wheel carriage 200 has a forward end 202 and an aft end 204, and comprises a left sub-carriage 220L and a right sub-carriage 220R, with left sub-carriage 220L carrying a left forward axle 210LF and a left aft axle 210LA in tandem, and with right sub-carriage 220R carrying a right forward axle 210RF and a right aft axle 210RA in tandem. In the illustrated embodiment, each axle is shown carrying four trailer wheels 215. Trailer wheel sub-carriages 220L and 220R have respective left and right sub-carriage extensions 240L and 240R extending forward from forward end 202 of wheel carriage 200, with the forwardmost ends of sub-carriage extensions 240L and 240R defining respective sub-carriage extension tongues 242L and 242R, the purpose and function of which are described later herein.

Wheel carriage 200 is mountable to trailer structure 120 such that sub-carriage extensions 240L and 240R are laterally movable relative to each other and to trailer structure 120, such that wheel carriage 200 can be selectively transitioned between a laterally expanded configuration (as shown in FIG. 1A) in which sub-carriages 220L and 220R are displaced laterally-outboard relative to trailer 120, and a laterally-retracted configuration (as shown in FIG. 1B). This particular functionality is schematically illustrated in FIGS. 1A and 1B as being enabled by forward and aft telescoping struts 230F and 230A acting between sub-carriages 220L and 220R in conjunction with hydraulic or pneumatic cylinders (not shown). However, this is by way of non-limiting example only, as any functionally suitable and non-inventive means may be used for this purpose without departing from the scope of the present disclosure.

Figure 2A:
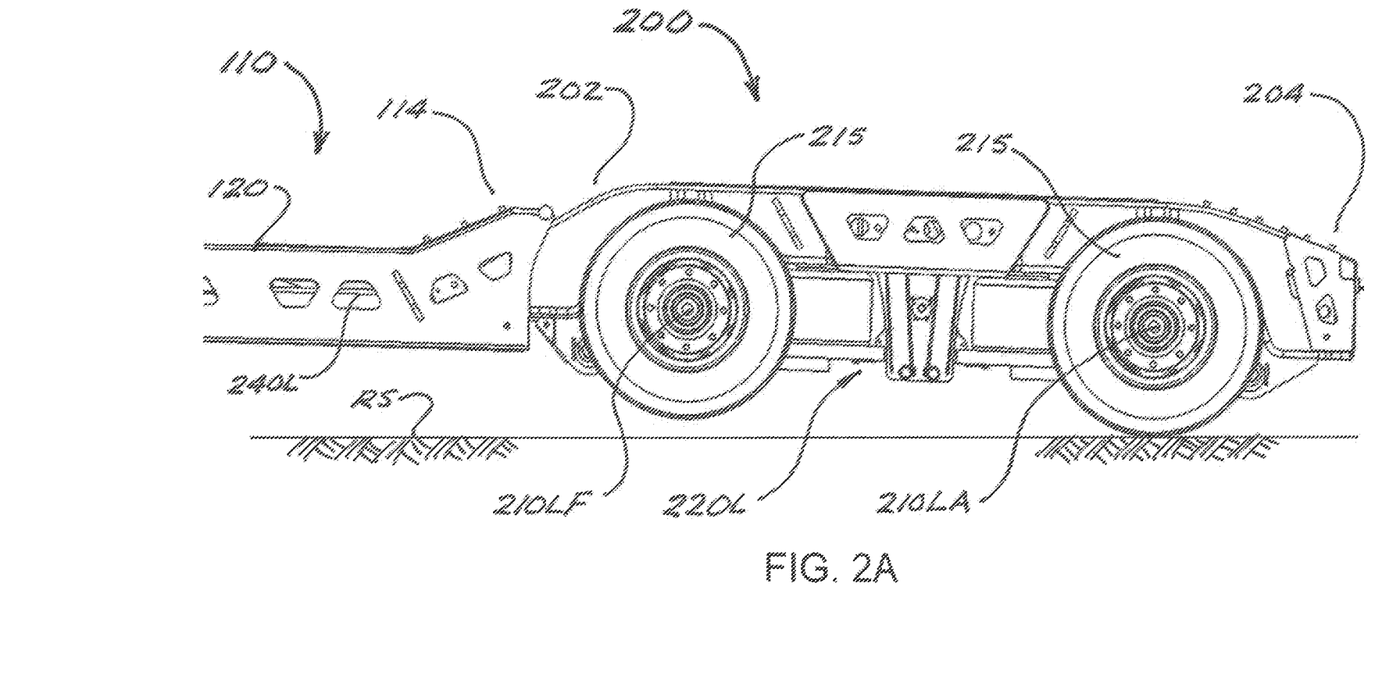
FIG. 2A is partial side elevation of the expandable trailer assembly in FIGS. 1A and 1B, as seen when unloaded and in the expanded configuration, with the forwardmost trailer wheels raised above the road surface due to the camber of the trailer deck.
Figure 2B:
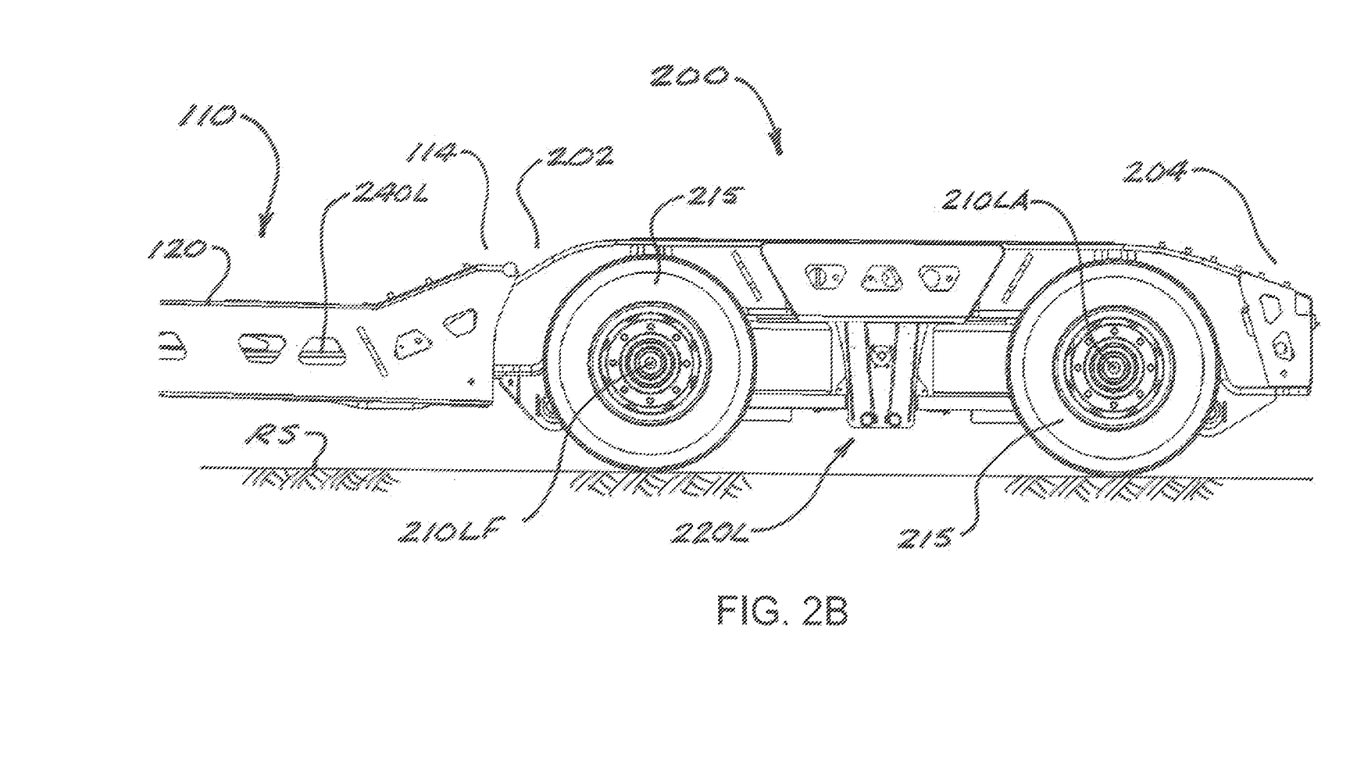
FIG. 2B is partial side elevation similar to FIG. 2A, but with the expandable trailer assembly in the retracted configuration, with both sets of trailer wheels being in contact with the road surface despite the camber of the trailer deck.
Figure 3A:
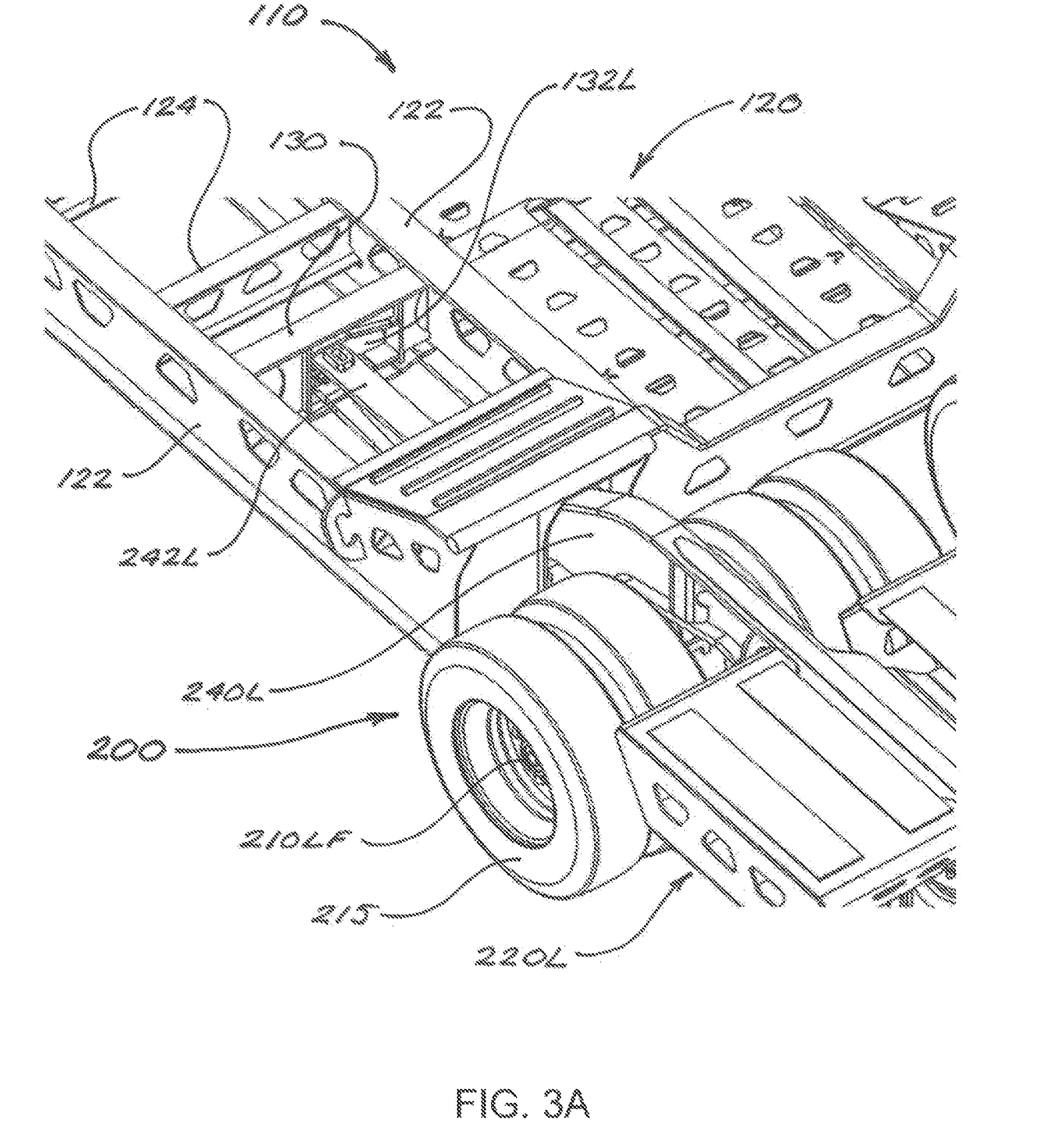
FIG. 3A is an isometric partial view of the left trailer wheel sub-carriage as seen when the trailer wheel carriage is in the expanded configuration, and showing the left sub-carriage tongue disposed within the left tongue slot of the first cross-beam of the trailer structure, with an intermediate region of the left sub-carriage extension disposed within the left fulcrum slot of the second (or rear) cross-beam of the trailer structure.
Figure 3B:
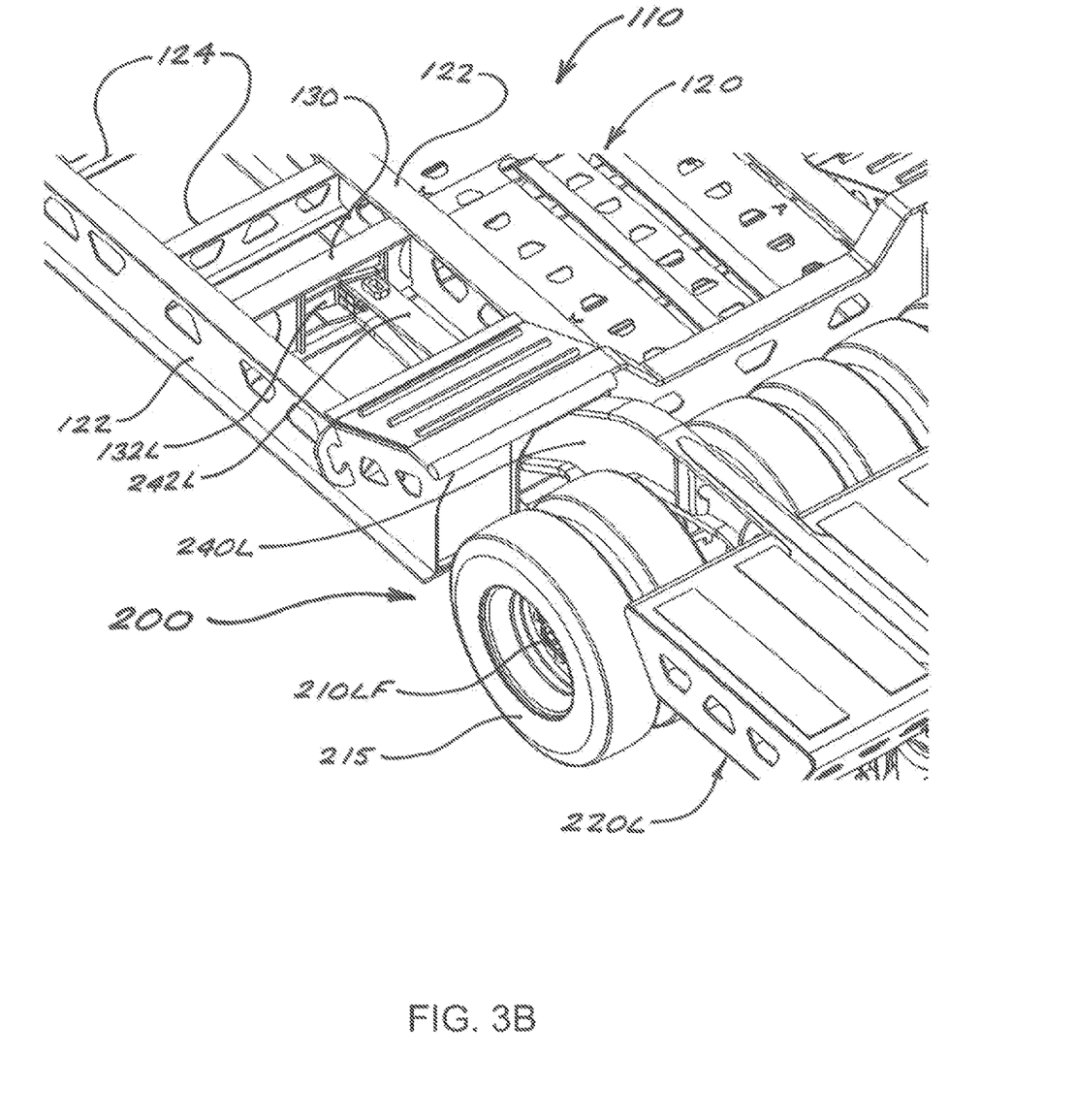
FIG. 3B is an isometric partial view of the left sub-carriage similar to FIG. 3A, but with the trailer wheel carriage shown in the retracted configuration.
Figure 4A:
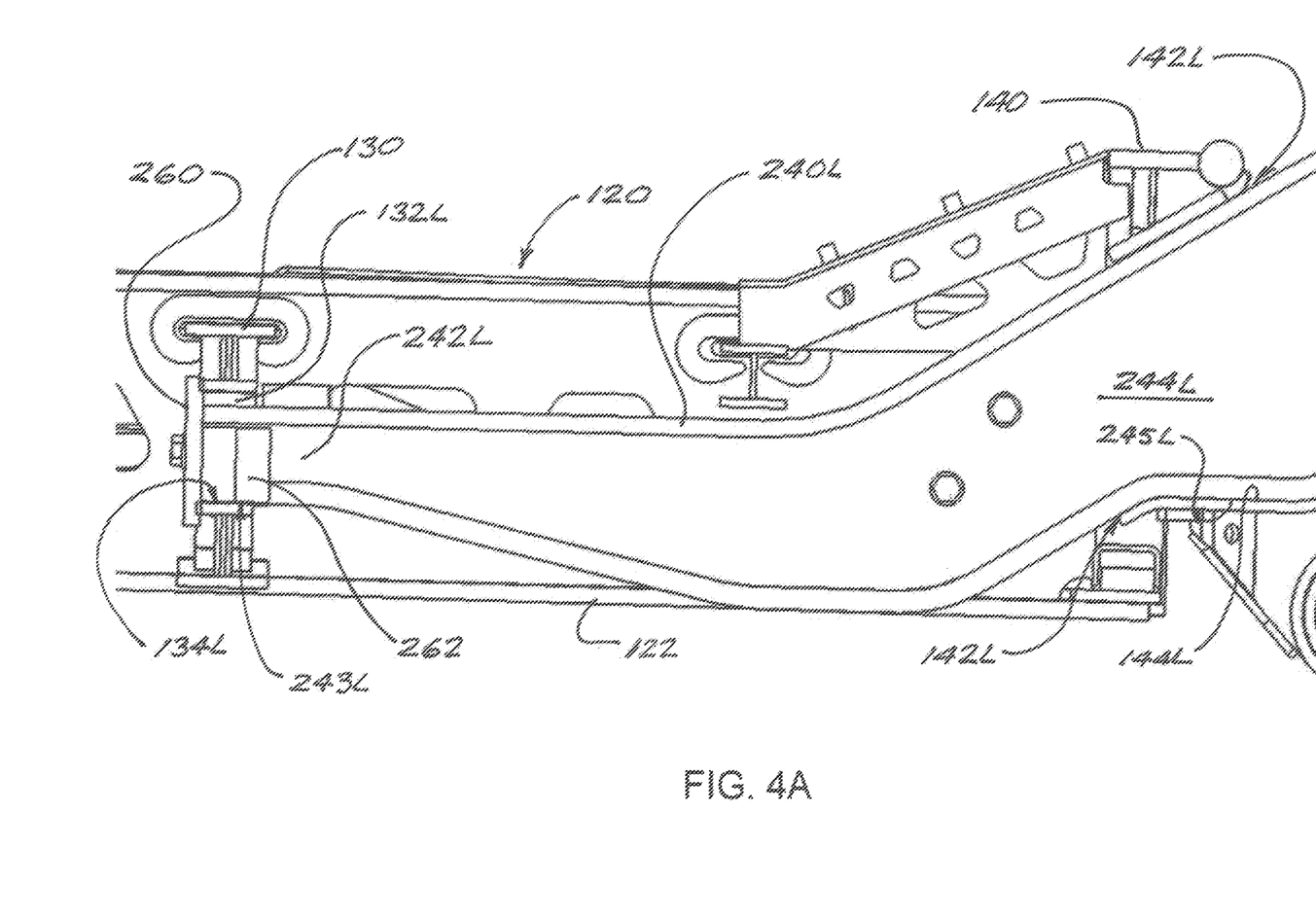
FIG. 4A is an elevational cross-section illustrating the orientation of the left sub-carriage extension, as seen when the trailer wheel carriage is in the expanded configuration.
Figure 4B:
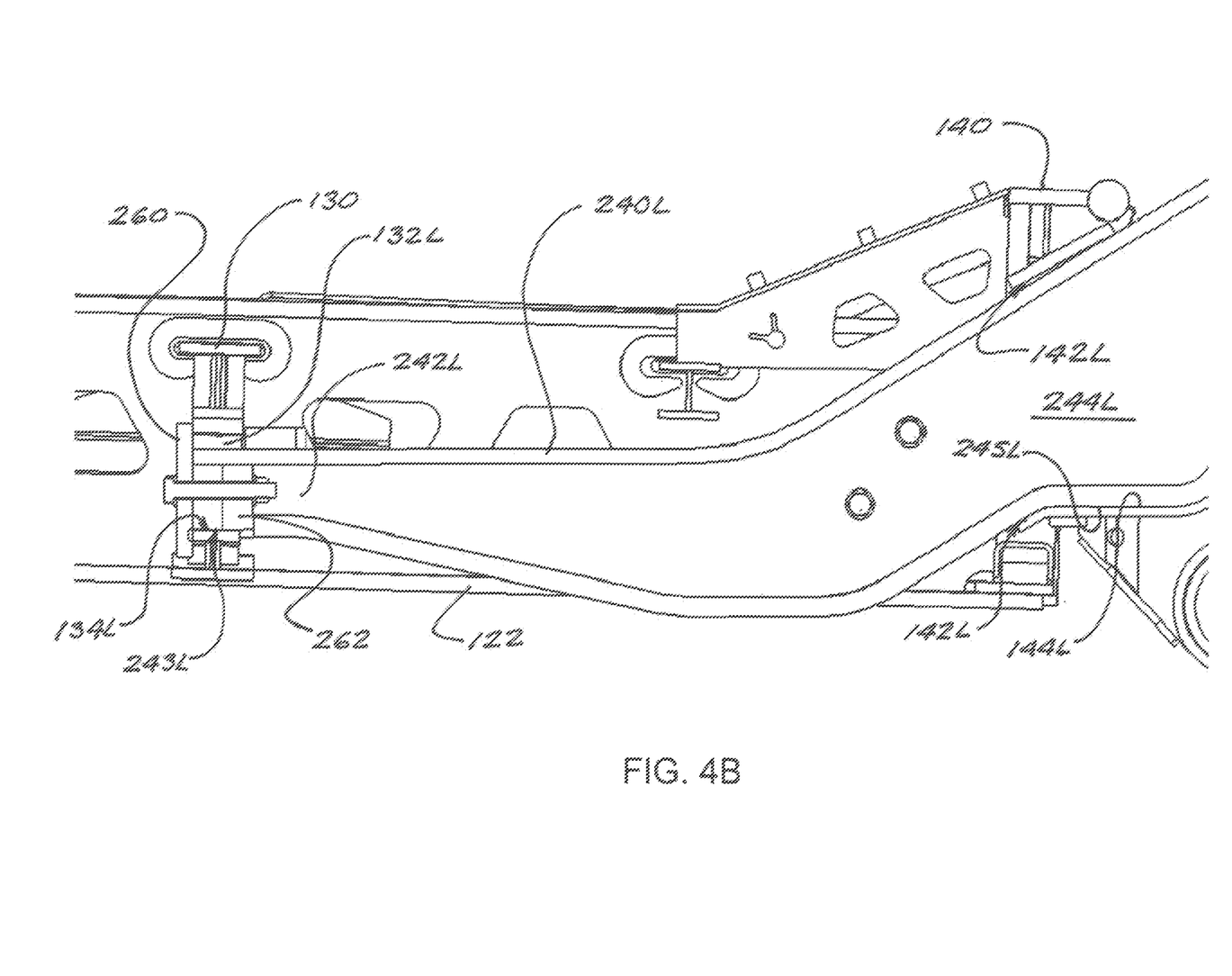
FIG. 4B is an elevational cross-section illustrating the orientation of the left sub-carriage extension, as seen when the trailer wheel carriage is in the retracted configuration.
Figure 5A:
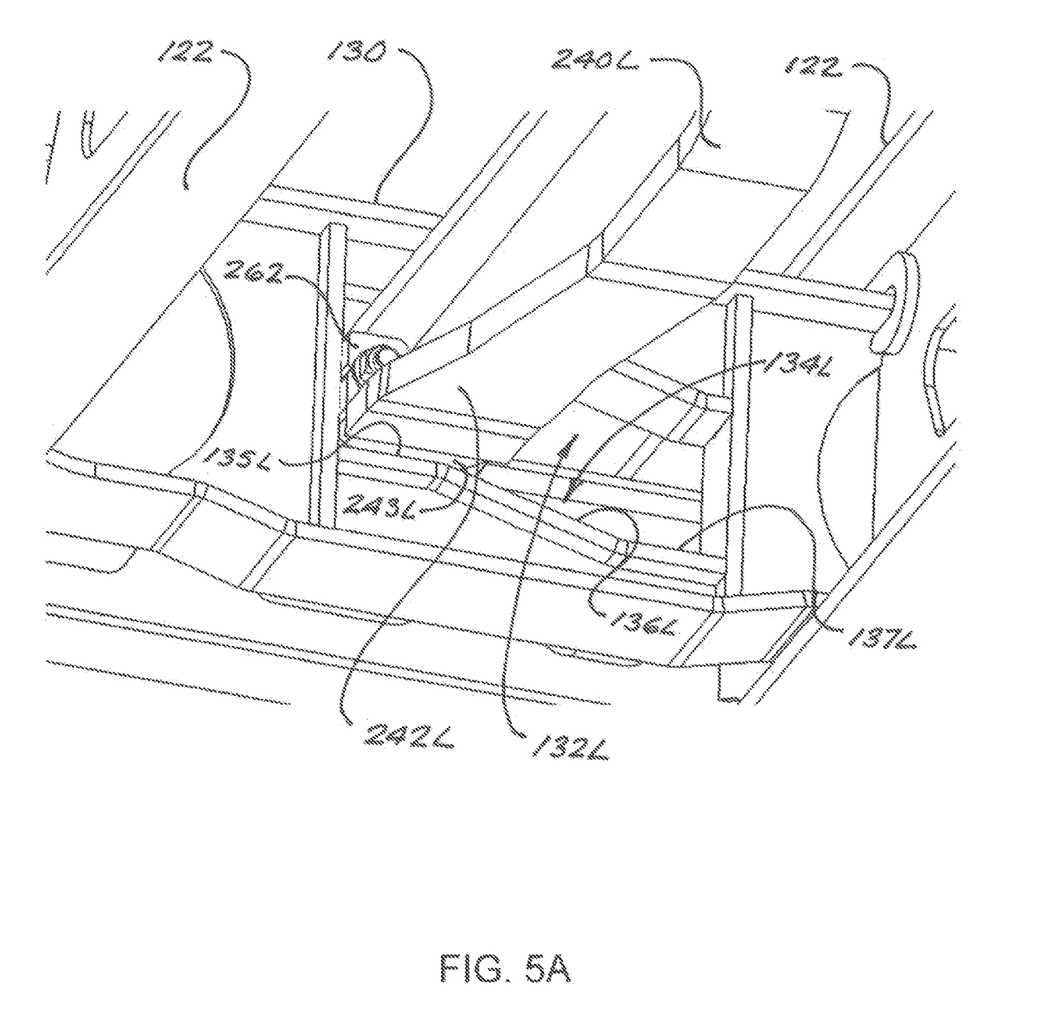
FIG. 5A is an upward and forward-looking isometric view of the left sub-carriage tongue disposed within the left tongue slot of the first cross-beam, as seen when the trailer wheel carriage is in the expanded configuration, and showing a rear abutment plate mounted to the left sub-carriage tongue to prevent movement of the left sub-carriage extension relative to the trailer deck structure in a first longitudinal direction.
Figure 5B:
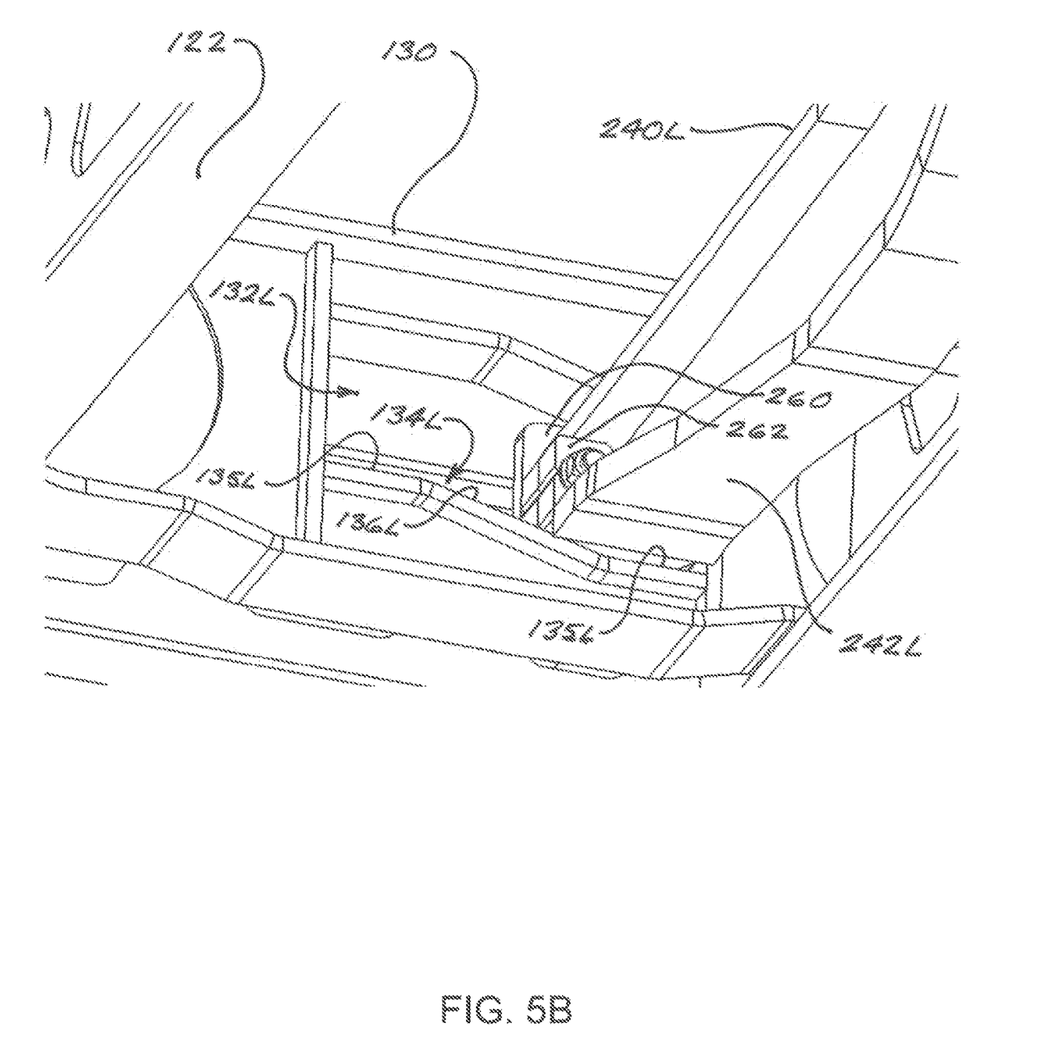
FIG. 5B is an isometric view similar to FIG. 5A, but with the trailer wheel carriage shown in the retracted configuration.
Figure 6A:
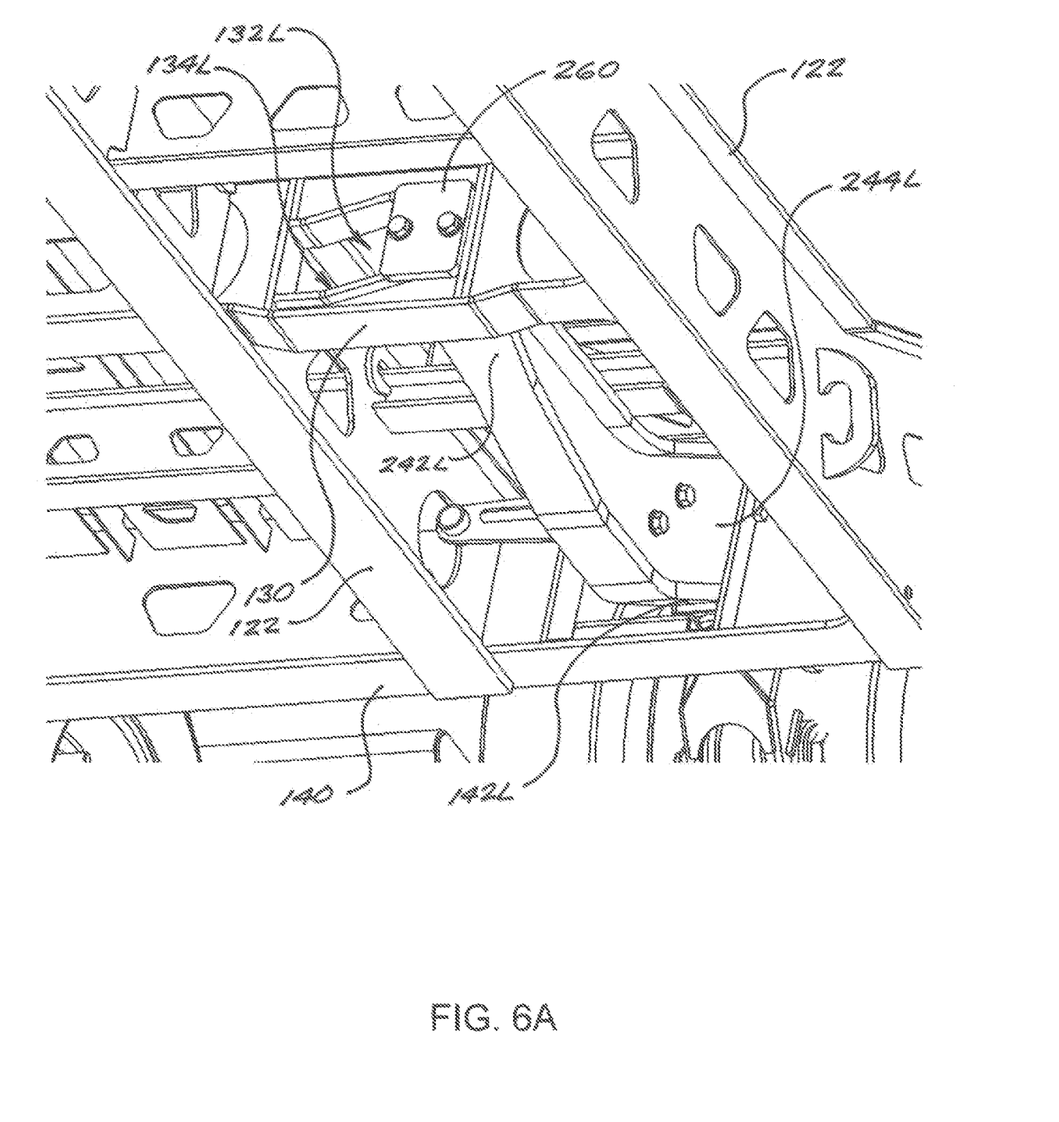
FIG. 6A is an upward and rearward-looking isometric view showing the left sub-carriage extension passing through the left fulcrum slot in the second cross-beam, and with the left sub-carriage tongue disposed within the left tongue slot of the first cross-beam, as seen when the trailer wheel carriage is in the expanded configuration, and further showing a front abutment plate mounted to the left sub-carriage tongue to prevent movement of the left sub-carriage extension relative to the trailer deck structure in a second longitudinal direction.
Figure 6B:
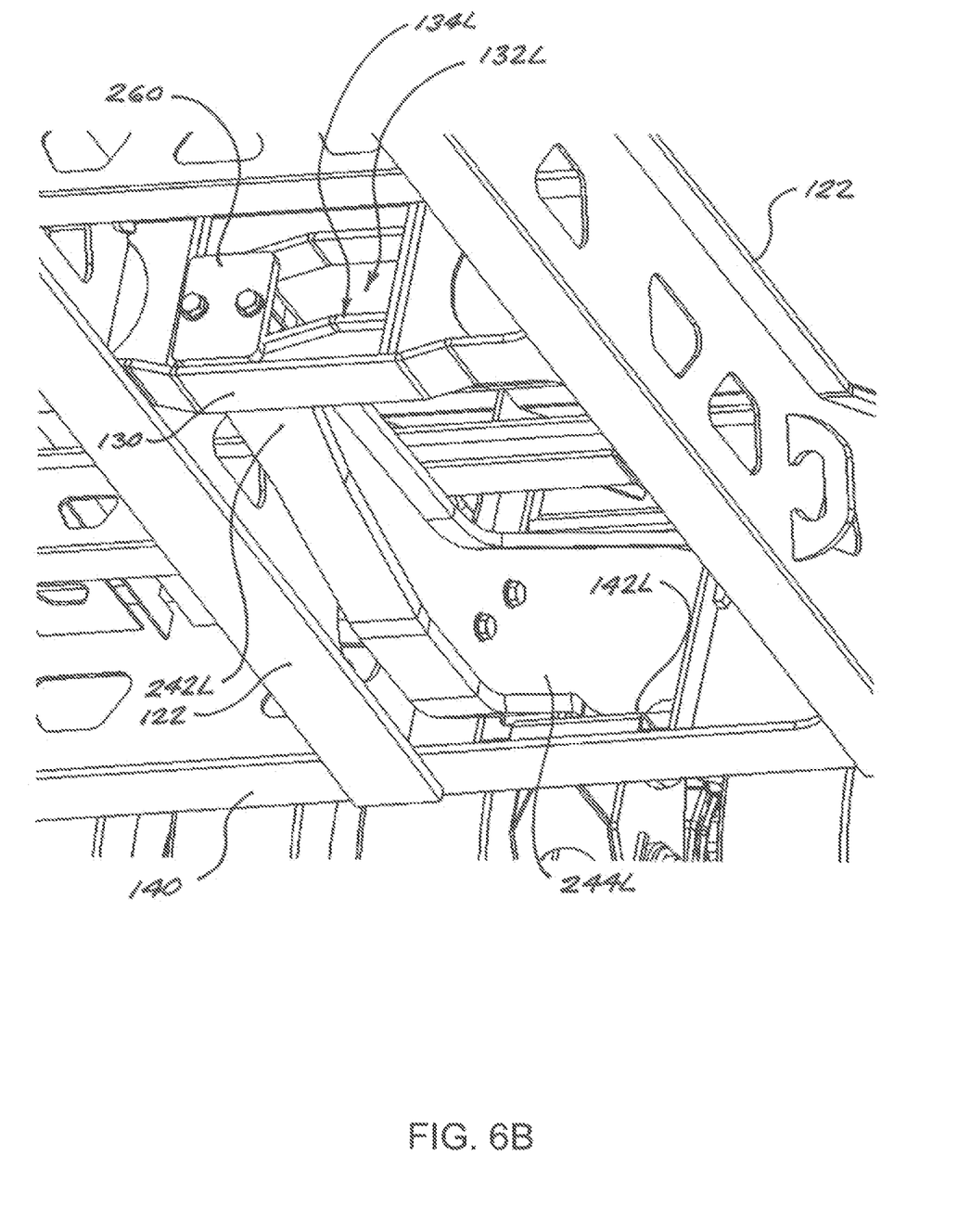
FIG. 6B is an isometric view similar to FIG. 6A, but with the trailer wheel carriage shown in the retracted configuration.

A distinguishing feature of embodiments in accordance with the present disclosure is that when wheel carriage 200 is in the expanded configuration and trailer 120 is carrying little or no load (as shown in FIG. 2A), wheels 215 on forward axles 210LF and 2102RF will be clear of the road surface RS while wheels 215 on aft axles 210LA and 210RA bear on road surface RS (as is typical for unloaded cambered trailers), but when wheel carriage 200 is in the retracted configuration (as shown in FIG. 2B), wheels 215 on forward axles 210LF and 210RF will be close to or in contact with road surface RS. As may be understood with reference to FIGS. 1A, 1B, and 3A-6B, this functionality is enabled by providing:

- a first transverse component in the form of a first cross-beam 130 incorporated into trailer structure 120 at a selected distance forward of aft end 114 of trailer 110, and defining laterally-elongate left and right "tongue slots" 132L and 132R configured to respectively receive sub-carriage tongues 242L and 242R; and
- a second transverse component in the form of a cross-beam 140 incorporated into trailer structure 120 aft of the first transverse component, and defining laterally-elongate left and right "fulcrum slots" 142L and 142R configured to respectively receive an intermediate region 244L of left sub-carriage extension 240L and an intermediate region 244R of right sub-carriage extension 240R;

wherein:
- tongue slots 132L and 132R in first cross-beam 130 respectively define left and right upward-facing guide surfaces 134L and 134R for respective engagement by downward-facing contact surfaces 243L and 243R (which may be flat or contoured) on sub-carriage extension tongues 242L and 242R, with guide surfaces 134L and 134R respectively comprising:
  - outboard (upper) sections 135L and 135R;
  - inboard (lower) sections 137L and 137R at a selected distance lower than outboard sections 135L and 135R; and
  - ramped sections 136L and 136R extending between and contiguous with, respectively, outboard and inboard sections 135L and 137L and outboard and inboard sections 135R and 137R; and
- fulcrum slots 142L and 142R in second cross-beam 140 respectively define left and right upward-facing horizontal guide surfaces 144L and 144R for respective engagement by downward-facing contact surfaces 245L and 245R (which may be flat or contoured) on intermediate regions 244L and 244R of sub-carriage extension 240L and 240R.

Accordingly, when wheel carriage 200 is being transitioned from its retracted configuration (as shown in FIGS. 1B, 2B, 3B, 4B, 5B, and 6B) to its expanded configuration (as shown in FIGS. 1A, 2A, 3A, 4A, 5A, and 6A), by moving sub-carriage extensions 240L and 240R outward relative to trailer 110, contact surfaces 243L and 243R on sub-carriage extension tongues 242L and 242R will respectively move:
- outward and out of contact with inboard (lower) sections 137L and 137R of guide surfaces 134L and 134R of tongue slots 132L and 132R in first cross-beam 130;
- outward and upward along ramped sections 136L and 136R; and
- further outward and into contact with outboard (upper) sections 135L and 135R of guide surfaces 134L and 134R;

while contact surfaces 245L and 245R on intermediate regions 244L and 244R of sub-carriage extension 240L and 240R respectively move horizontally outward along guide surfaces 144L and 144R of fulcrum slots 142L and 142R in second cross-beam 140.

Similarly, when wheel carriage 200 is being transitioned from its expanded configuration to its retracted configuration, by moving sub-carriage extensions 240L and 240R inward relative to trailer 110, contact surfaces 243L and 243R on sub-carriage extension tongues 242L and 242R will respectively move:
- inward and out of contact with outboard (upper) sections 135L and 135R of guide surfaces 134L and 134R of tongue slots 132L and 132R in first cross-beam 130;
- inward and downward along ramped sections 136L and 136R; and
- further inward and into contact with inboard (lower) sections 137L and 137R of guide surfaces 134L and 134R;

while contact surfaces 245L and 245R on intermediate regions 244L and 244R of sub-carriage extension 240L and 240R respectively move horizontally inward along guide surfaces 144L and 144R of fulcrum slots 142L and 142R in second cross-beam 140.

The inside height of fulcrum slots 142L and 142R is preferably selected to constrain vertical movement of sub-carriage extensions 240L and 240R within fulcrum slots 142L and 142R relative to second cross-beam 140, preferably with only enough vertical clearance to permit slight longitudinal rotation of sub-carriage extensions 240L and 240R within fulcrum slots 142L and 142R as they move outward or inward relative to trailer 110. Accordingly, sub-carriage extensions 240L and 240R will act as levers pivoting about second cross-beam 140 causing the longitudinal pitch of wheel carriage 200 to change relative to trailer 110 as wheel carriage 200 is transitioned between its expanded and retracted configurations, so as:

- to elevate forward axles 210LF and 2102RF relative to aft axles 210LA and 210RA when transitioning to the expanded configuration, as seen in FIG. 2A; and
- to lower forward axles 210LF and 2102RF relative to aft axles 210LA and 210RA when transitioning to the retracted configuration, as seen in FIG. 2B.

In the illustrated embodiment, and as most clearly seen in FIGS. 5A-6B, each of guide surfaces 134L and 134R of tongue slots 132L and 132R in first cross-beam 130 is shown as being formed by three flat plates defining the corresponding outboard (upper) section of the guide surface, the ramped section, and inboard (lower) section, but this is by way of non-limiting example only.

In one unillustrated variant embodiment, each of guide surfaces 134L and 134R of tongue slots 132L and 132R in first cross-beam 130 could be formed from a single plate shaped to define the outboard, ramped, and inboard sections, but with curvilinear transitions between adjacent sections to promote smooth movement of contact surfaces 243L and 243R of sub-carriage extension tongues 242L and 242R over guide surfaces 134L and 134R.

In further unillustrated variant embodiments, downward-facing contact surfaces 243L and 243R on sub-carriage extension tongues 242L and 242R and/or downward-facing contact surfaces 245L and 245R on intermediate regions 244L and 244R of sub-carriage extension 240L and 240R could be provided in the form of rolling elements such as:

- rollers running on the respective guide surfaces of guide surfaces 134L and 134R and/or fulcrum slots 142L and 142R; or
- track wheels running on guide surfaces provided in the form of tracks formed in tongue slots 132L and 132R and/or fulcrum slots 142L and 142R to promote even smoother lateral of movement of sub-carriages 220L and 220R within sub-carriages 220L and 220R and fulcrum slots 142L and 142R.

FIGS. 4A-6B illustrate one exemplary and non-limiting means for releasably fixing the longitudinal position of sub-carriages 220L and 220R relative to trailer deck structure 120, in the form of:

- front retention members (e.g., plates) 260 each attachable to a front face of sub-carriage extension tongue 242L or 242R such that a portion of each front retention member 260 will be disposed close to a front surface of first cross-beam 130 or associated structure (e.g., framing associated with a tongue slot 132L or 132R); and
- rear retention members (e.g., plates or lugs) 262 each attachable to a sub-carriage extension tongue 242L or 242R after of first cross-beam 130 such that a portion of each rear retention member 262 will be disposed close to a rear surface of first cross-beam 130 or associated structure, without impeding respective lateral movement of sub-carriage extension tongues 242L and 242R within tongue slots 132L and 132R.

Persons of ordinary skill in the art will readily appreciate that various alternative means for releasably fixing the longitudinal position of sub-carriages 220L and 220R relative to trailer deck structure 120 can be devised without inventive ingenuity, as well as means for enabling multiple optional longitudinal positions in which sub-carriages 220L and 220R can be releasably fixed to trailer deck structure 120, and such alternative means and embodiments incorporating same are intended to come within the scope of the present disclosure.

Although the embodiments described and illustrated herein relate specifically to lowboy trailers, this is by way of non-limiting example only. In alternative embodiments, and as persons of ordinary skill in the art will readily appreciate, variable-pitch trailer wheel assemblies in accordance with the present disclosure can be readily adapted for use in association with other styles of trailer without departing from the scope of the present disclosure.

It will be readily appreciated by those skilled in the art that various modifications to embodiments in accordance with the present disclosure may be devised without departing from the scope of the present teachings, including modifications which may use equivalent structures or materials hereafter conceived or developed. It is to be especially understood that the scope of the present disclosure is not intended to be limited to described or illustrated embodiments, and that the substitution of a variant of a claimed or illustrated element or feature, without any substantial resultant change in functionality, will not constitute a departure from the scope of the disclosure.

In this patent document, any form of the word "comprise" is to be understood in its non-limiting sense to mean that any element or feature following such word is included, but elements and/or features not specifically mentioned are not excluded. A reference to an element or feature by the indefinite article "a" does not exclude the possibility that more than one such element or feature is present, unless the context clearly requires that there be one and only one such element or feature.

Any use of any form of the terms "connect", "engage", "couple", "attach", "mount", or any other term describing an interaction between elements is not meant to limit the interaction to direct interaction between the subject elements, and may also include indirect interaction between the elements such as through secondary or intermediary structure.

Relational and conformational terms such as (but not limited to) "vertical", "horizontal", "upward-facing", and "downward-facing" are not intended to denote or require absolute mathematical or geometrical precision. Accordingly, such terms are to be understood as denoting or requiring substantial precision only (e.g., "substantially vertical", or "generally upward-facing") unless the context clearly requires otherwise. All uses herein of the terms "left", "right", "front", "rear", "forward", "rearward", and "aft" are relative to the direction of forward travel of the described trailer assemblies.

Wherever used in this document with reference to an element or feature (or a combination of elements and/or features) of a particular disclosed embodiment, the terms "preferable" and "preferably" are to be understood as meaning that the element or feature (or combination of elements and/or features) in question is optional and not essential to that embodiment, and therefore may be absent from other embodiments without departing from the scope of the present disclosure.

Wherever used in this document, the terms "typical" and "typically" are to be understood and interpreted in the sense of being representative of exemplary common usage or practice only, and are not to be understood or interpreted as implying essentiality or invariability.

What is claimed is:

1. An expandable trailer assembly comprising:
   (a) a trailer having a front end, an aft end, and a trailer deck structure, said trailer deck structure incorporating a first transverse component at a selected distance forward of the aft end of the trailer and a second transverse component aft of the first transverse component;
   (b) a trailer wheel carriage assembly comprising a left sub-carriage and a right sub-carriage, each carrying a forward axle and an aft axle in tandem, and each having a sub-carriage extension having a front end defining a sub-carriage extension tongue;
   (c) actuation means acting transversely between the right and left sub-carriages, for selectively moving the right and left sub-carriages either laterally outward away from each other or laterally inward toward each other; and
   (d) means for releasably fixing the longitudinal position of the right and left sub-carriages relative to the trailer deck structure;
   wherein:
   (e) the first transverse component defines laterally-elongate left and right tongue slots for respectively receiving the left and right sub-carriage extension tongues;
   (f) the second transverse component defines laterally-elongate left and right fulcrum slots for receiving respective intermediate regions of the left and right sub-carriage extensions;
   (g) the left and right tongue slots respectively define left and right upward-facing guide surfaces for respective engagement by downward-facing contact surfaces on the left and right sub-carriage extension tongues; and
   (h) the left and right fulcrum slots respectively define left and right upward-facing guide surfaces for respective engagement by downward-facing contact surfaces on intermediate regions of the sub-carriage extensions;
   wherein the guide surfaces of the tongue slots and the fulcrum slots are configured such that when the left and right sub-carriage extension tongues are respectively disposed within the left and right tongue slots, and the intermediate regions of the left and right sub-carriage extensions are respectively disposed within the left and right fulcrum slots:
   laterally-outward movement of the left and right sub-carriages will elevate the forward axles relative to the aft axles; and
   laterally-inward movement of the left and right sub-carriages will lower the forward axles relative to the aft axles.

2. The expandable trailer assembly as in claim 1 wherein at least one of the first and second transverse members is a cross-beam.

3. The expandable trailer assembly as in claim 1 wherein the means for releasably fixing the longitudinal position of the right and left sub-carriages relative to the trailer deck structure comprises front and rear retention members respectively attachable to the sub-carriage tongues forward of and aft of the first transverse member.

4. The expandable trailer assembly as in claim 1 wherein:
   (a) the upward-facing guide surface of each tongue slot comprises an outboard section, an inboard section at a lower elevation than the outboard section, and a ramped section extending between and contiguous with the outboard and inboard sections; and
   (b) the upward-facing guide surface of each fulcrum slot comprises a substantially horizontal surface.

5. The expandable trailer assembly as in claim 4 wherein the upward-facing guide surface of each tongue slot comprises a curvilinear surface.

6. The expandable trailer assembly as in claim 1 wherein the downward-facing contact surfaces of the sub-carriage extension tongues and the intermediate sections of the sub-carriage extensions are contoured surfaces.

7. The expandable trailer assembly as in claim 1 wherein each of the downward-facing contact surfaces of the sub-carriage extension tongues and the intermediate sections of the sub-carriage extensions comprises a rolling element.

8. The expandable trailer assembly as in claim 1 wherein the actuation means comprises means selected from the group consisting of hydraulic cylinders, pneumatic cylinders, rack-and-pinion arrangements, and mechanical linkages.

9. The expandable trailer assembly as in claim 1 wherein the longitudinal position of the right and left sub-carriages can be releasably fixed in any selected one of two or more longitudinal positions relative to the trailer deck structure.

* * * * *